June 1, 1943.  R. G. LE TOURNEAU  2,320,620
SELF-PROPELLED CRANE
Filed Aug. 24, 1942  2 Sheets-Sheet 2

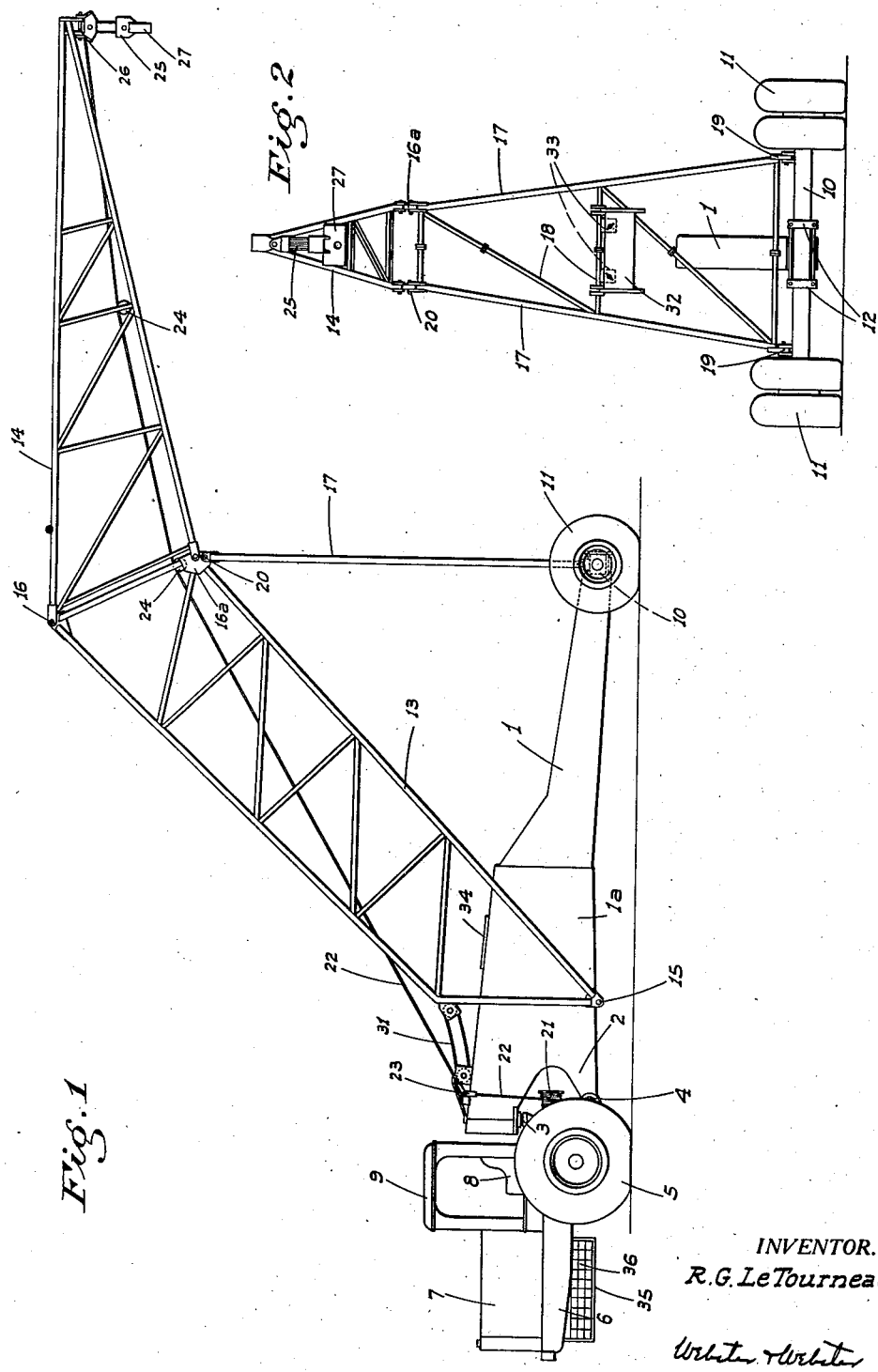

INVENTOR.
R.G. LeTourneau
BY
ATTORNEYS

Patented June 1, 1943

2,320,620

UNITED STATES PATENT OFFICE 2,320,620

SELF-PROPELLED CRANE

Robert G. Le Tourneau, Peoria, Ill., assignor to R. G. Le Tourneau, Inc., Stockton, Calif., a corporation of California Application August 24, 1942, Serial No. 455,903

11 Claims. (Cl. 212—144)

This invention relates in general to an improved portable crane, and in particular the invention is directed to a portable, wheel-supported crane which is self-propelled.

The principal objects of this invention are to provide a tractor-propelled crane having a long boom reach, yet being characterized by stability and ready portability.

It is also an object of this invention to provide a portable crane which includes as a support for a relatively long, upwardly and rearwardly extending boom assembly, an elongated, substantially horizontal wheel-supported body, and a supporting post unit secured to and upstanding from a fixed rear wheel truck; the lower end of the boom assembly being secured to the body adjacent its forward end, and the upper end of the post unit being secured to said boom assembly substantially centrally between the ends of the latter.

Another object of this invention is to provide a portable crane which includes a boom which, while normally in a fixed operative position, may be lowered from, and subsequently elevated to, said position by power from the tractor whereby to facilitate repair or transportation of the boom assembly of the implement.

A further object of this invention is to provide unique means detachably mounted on the boom assembly in an inoperative position and arranged to be incorporated in said assembly in an operative position to effect an elevation of the outer section thereof when a greater lifting height is desired.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the implement.

Figure 2 is a rear end view of the implement.

Figure 3:
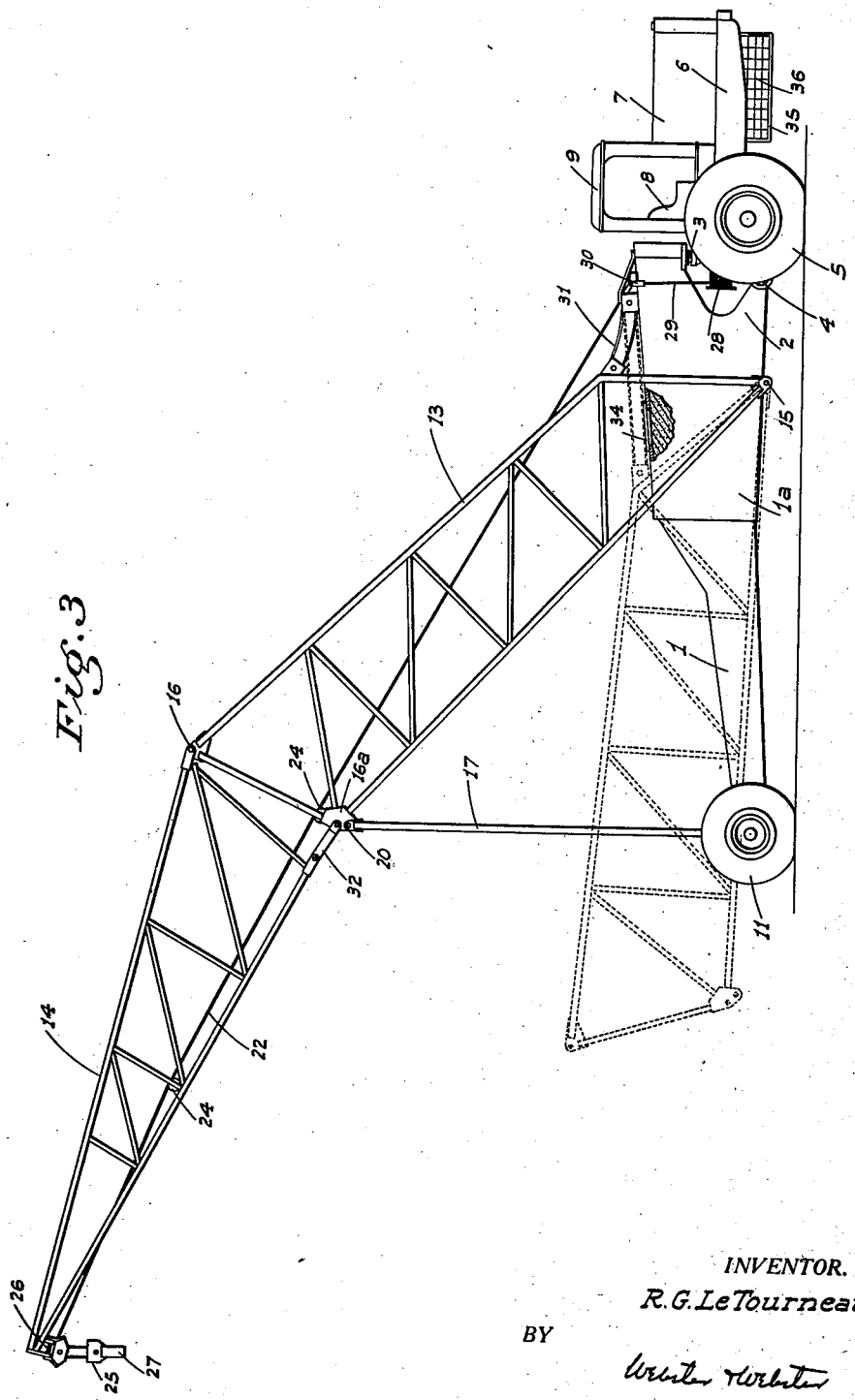
Figure 3 is a side elevation of the implement illustrating the boom extension in use; the lower section of the boom assembly being shown in dotted lines in lowered position.

Referring now more particularly to the characters of reference on the drawings, the implement comprises a relatively long, substantially horizontal body 1 disposed adjacent but in clearance relation to the ground; said body being relatively narrow and generally tapering in height from front to rear. This body is of substantial weight, preferably being fabricated from sheet steel welded together to form a hollow, unitary structure. At its forward end, the body 1 is formed with a forwardly opening yoke 2, the legs of which are vertically spaced and connected by suitable draft connections 3 and 4 respectively, with the rear end of a two-wheel tractor. This tractor includes transversely spaced supporting and drive wheels 5, a forwardly projecting ground overhanging frame 6, an engine 7 mounted on said frame and connected in driving relation with wheels 5, and an operator's seat 8 mounted within a cab 9.

The connections 3 and 4, while permitting of turning movement of the tractor relative to body 1, are arranged to maintain said tractor and body in vertically inflexible relation.

At its rear end, the body 1 is supported by a fixed, rear-wheel truck, which includes a horizontal transverse axle 10 supported at opposite ends by dual wheels 11; said axle being of a length substantially greater than the width of body 1, and being attached at the center to the body adjacent its lower edge by means such as a bracket unit 12.

The boom assembly of the implement is of skeleton type construction, and includes a lower boom section 13 and an upper boom section 14, both of which are rectangular in cross section; the upper section 14 tapering in both a horizontal and vertical plane toward its outer end. The lower end of boom section 13 straddles the body 1 and is pivoted on a cross shaft 15 at the lower edge of body 1 adjacent its forward end. From said point of pivotal connection, the lower section 13 of the boom assembly normally extends at an upward and rearward incline.

The upper section 14 of the boom assembly projects upwardly and rearwardly from the upper end of the lower section 13, but at a somewhat lesser angle than the latter. The boom sections 13 and 14 are detachably and pivotally connected together at adjacent ends at the upper corners by means of clevis and plate connections indicated at 16, and similar connections 16a at the lower corners, the latter connections being disposed at a point in substantial vertical alinement with axle 10. The boom assembly thus overhangs and projects some distance rearwardly of the corresponding end of the body 1.

A pair of transversely spaced, upstanding posts 17 extend from axle 10 adjacent the wheels 11 upwardly in slightly converging relation toward their upper ends; said posts being connected together as a unit by suitable bracing 18. At the lower end, the posts are connected to the axle by releasable clevis and plate connections 19, while at its upper end the posts are formed with clevices 20 which detachably connect with the plates of the adjacent clevis and plate connections 16a.

The two-wheel tractor includes at its rear end, and between the vertically spaced legs of yoke 2, a two-drum power control unit or winch of conventional design, which is driven from the tractor; one of the drums of said power control unit or winch being indicated at 21. A cable 22 leads from said drum 21 over a direction changing sheave on the body and thence extends through the boom assembly to its outer end, being guided through said assembly on pulleys 24. At the upper or outer end of the boom assembly the cable includes a fall reeved through the blocks of a block and tackle unit indicated generally at 25; the stationary one of said blocks being pivotally secured to the boom end as at 26. The movable block of block and tackle unit 25 is fixed with an attachment plate 27 for connection with the work or object to be lifted, or a lifting hook. Actuation of drum 21 effects the raising and lowering of attachment plate 27, and this operation is under the control of the tractor operator.

The power control unit or winch includes another drum 28 from which a cable 29 leads over a direction changing sheave 30 on the body. From said sheave 30, the cable is reeved in a block and tackle unit 31, which connects between the top of body 1 ahead of the boom and the boom a short distance above the body.

By virtue of the above described structure, the crane has a long boom reach and high maximum point of lift, but at the same time provides great lifting power, due to the fact that the boom assembly connects with the body adjacent its forward end, and is supported substantially centrally of its ends by the vertical post unit which connects with the rear axle 10 of the fixed, rear wheel truck. Another factor which enhances the lifting power of the crane is the substantial weight of body 1, its substantial length between cross shaft and axle 10, and the weight of the two-wheel tractor connected to the forward end body 1 in vertically inflexible relation thereto.

The normal operative position of the boom assembly is shown in Fig. 1. However, if a greater lifting height is desired, the clevis and plate connections 16a at the lower corners at adjacent ends of the boom sections 13 and 14 are detached, the sections are swung about their upper corners on pivots 16, and a boom extension or spreader 32 is secured in place between said lower and adjacent corners of the boom sections 13 and 14. This boom extension is normally mounted on the lower section 17 on one of the brace members 18, as shown in Fig. 2; the boom extension being releasably attached by nuts and wing bolts to brackets 33 on said brace members.

For transportation or repair, the boom assembly is lowered in the following manner:

The block and tackle 31 is actuated from drum 28 to place a slight pull on the boom assembly. Thereupon the connections 19 between the post unit and axle 10 are detached, and said post unit is swung slightly rearwardly. Then the boom assembly is lowered by means of block and tackle 31 until the post unit seats upon the ground. Thereupon, the implement is driven forward slowly by the two-wheel tractor which swings the post unit forwardly until the outer end or nose of the upper section 14 of the boom assembly engages the ground. The lower connections 20 may then be disengaged, and the boom assembly lowered farther. The boom section 14 is then blocked up, and the upper connections 16 are disengaged. To erect the boom, the reverse procedure is followed, the connections 16 being engaged first. The lower section 13 of the boom assembly, when in lowered position, straddles the body and axle 10; said section 13 being shown in lowered position in dotted lines in Fig. 3.

To increase the weight of the crane when in use, the hollow forward section 1a of the body is filled with concrete sand or water through a top manhole. Also, cradles 35 are slung from the frame members 6 of the tractor, in which are hung transverse metal bars 36, which are preferably about as long as the over-all width of the tractor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A portable crane comprising a relatively long, substantially horizontal body, wheels supporting the body adjacent its rear end, a two-wheel tractor ahead of the body, said tractor having a frame and engine assembly projecting forwardly of the wheels in overhanging relation to the ground, draft means connecting adjacent ends of the tractor and body in vertically inflexible relation, a relatively long boom secured to and extending at an upward and rearward incline from the forward end portion of the body, and an upstanding post unit mounted in connection with the rear end portion of the body, said post unit being secured at its upper end to the boom intermediate its ends and a substantial distance from the outer end thereof.

2. A crane as in claim 1 in which said post unit is substantially vertical and is secured to said boom substantially centrally between the ends of the latter.

3. A portable crane comprising a body, means supporting the body for movement along the ground, said means including a wheel axle fixed on and projecting beyond the sides of the body adjacent one end thereof, a normally upwardly inclined boom, the lower end of said boom straddling and being pivoted in connection with the body adjacent its other end for vertical swinging movement parallel to the body, and means releasably holding the boom at such incline, the boom when released and lowered straddling the body and resting on said axle.

4. A portable crane comprising a body supported for movement along the ground, an upwardly inclined boom assembly, said assembly including upper and lower sections detachably connected at adjacent ends, means pivotally securing the boom assembly at its lower end in connection with the body adjacent one end thereof, and an upstanding post detachably connected between the body adjacent its other end and the boom assembly at said adjacent ends of the boom sections; there being normally inactive means operative to control pivotal movement of the boom assembly when said post is detached at one end.

5. A crane comprising with a supporting structure, a lower boom section projecting at an upward angle from and mounted in a fixed operating position on said structure, an upper boom section projecting from the lower section, said sections both having upper and lower corners at their adjacent ends, means pivoting the upper corners of the sections together, means detachably connecting the lower corners together in normally close association and a spreader unit adapted to extend between and be connected to the lower corners when the latter are detached from each other and separated a predetermined distance.

6. A portable crane comprising a relatively long body, wheels supporting the body adjacent its rear end, a tractor ahead of the body, draft means connecting adjacent ends of the tractor and body in vertically inflexible, horizontally steerable relation, a relatively long rearwardly and upwardly inclined boom, means connecting said boom at its lower end to the body adjacent the forward end of the latter, and an upstanding post unit mounted in connection with the body adjacent its rear end and supporting the boom intermediate its ends; the body being initially hollow adjacent its forward end, and a substantial quantity of weight increasing material disposed in said hollow portion of the body.

7. A portable crane comprising, in unitary relation, a relatively long body, wheels supporting the body adjacent its rear end, a two-wheel tractor ahead of the body, draft means connecting adjacent ends of the tractor and body in vertically inflexible, horizontally steerable relation, a relatively long rearwardly and upwardly inclined boom, means connecting said boom at its lower end to the body adjacent the forward end of the latter, and an upstanding post unit mounted in connection with the body adjacent its rear end and supporting the boom intermediate its ends; said two-wheel tractor having a frame and engine assembly projecting forwardly of its wheels in overhanging relation to the ground, and weight increasing means suspended from said frame and engine assembly ahead of said wheels.

8. A portable crane comprising, in unitary relation, a relatively long body, wheels supporting the body adjacent its rear end, a two-wheel tractor ahead of the body, draft means connecting adjacent ends of the tractor and body in vertically inflexible, horizontally steerable relation, a relatively long rearwardly and upwardly inclined boom, means connecting said boom at its lower end to the body adjacent the forward end of the latter, and an upstanding post unit mounted in connection with the body adjacent its rear end and supporting the boom intermediate its ends; the forward end of the body being initially hollow and filled with a substantial quantity of weight-increasing material, said two-wheel tractor having a frame and engine assembly projecting forwardly of its wheels in overhanging relation to the ground, and weight increasing means suspended from said frame and engine assembly ahead of said wheels.

9. A portable crane comprising a relatively long body, the lower edge of said body being disposed relatively close to the ground, means supporting the body for movement along the ground comprising a front and rear pair of transversely spaced wheels, between which pairs the body is centrally disposed, a normally upwardly and rearwardly inclined boom, the lower end portion of said boom straddling the body adjacent its forward end, the lower end of said boom being pivotally secured in connection with the body adjacent the lower edge of the latter, and an upstanding post unit mounted in connection with the body adjacent its rear end and supporting the boom intermediate its ends; at least the rear pair of said wheels being relatively widely spaced.

10. A portable crane as in claim 9 in which the forward end portion of the body is initially hollow and filled with a substantial quantity of weight increasing material.

11. A portable crane comprising a relatively long wheel supported body including a wheel axle secured in connection with and projecting laterally a substantial distance on opposite sides of the body adjacent its rear end, ground engaging wheels on the outer end portions of said axle, an upwardly and rearwardly inclined boom secured at its lower end in connection with said body at the forward end thereof, and an upstanding post unit supporting the boom intermediate its ends, said post unit including a pair of upwardly converging posts, said posts being attached at the lower ends in connection with the axle adjacent said wheels.

ROBERT G. LE TOURNEAU.